W. J. EVANS.
COMBINED DRIVING AND STEERING WHEEL.
APPLICATION FILED AUG. 18, 1916.

1,269,068.

Patented June 11, 1918
2 SHEETS—SHEET 1.

WITNESSES
Howard D. Orr
F. J. Chapman

William J. Evans, INVENTOR,

BY E. G. Siggers
ATTORNEY

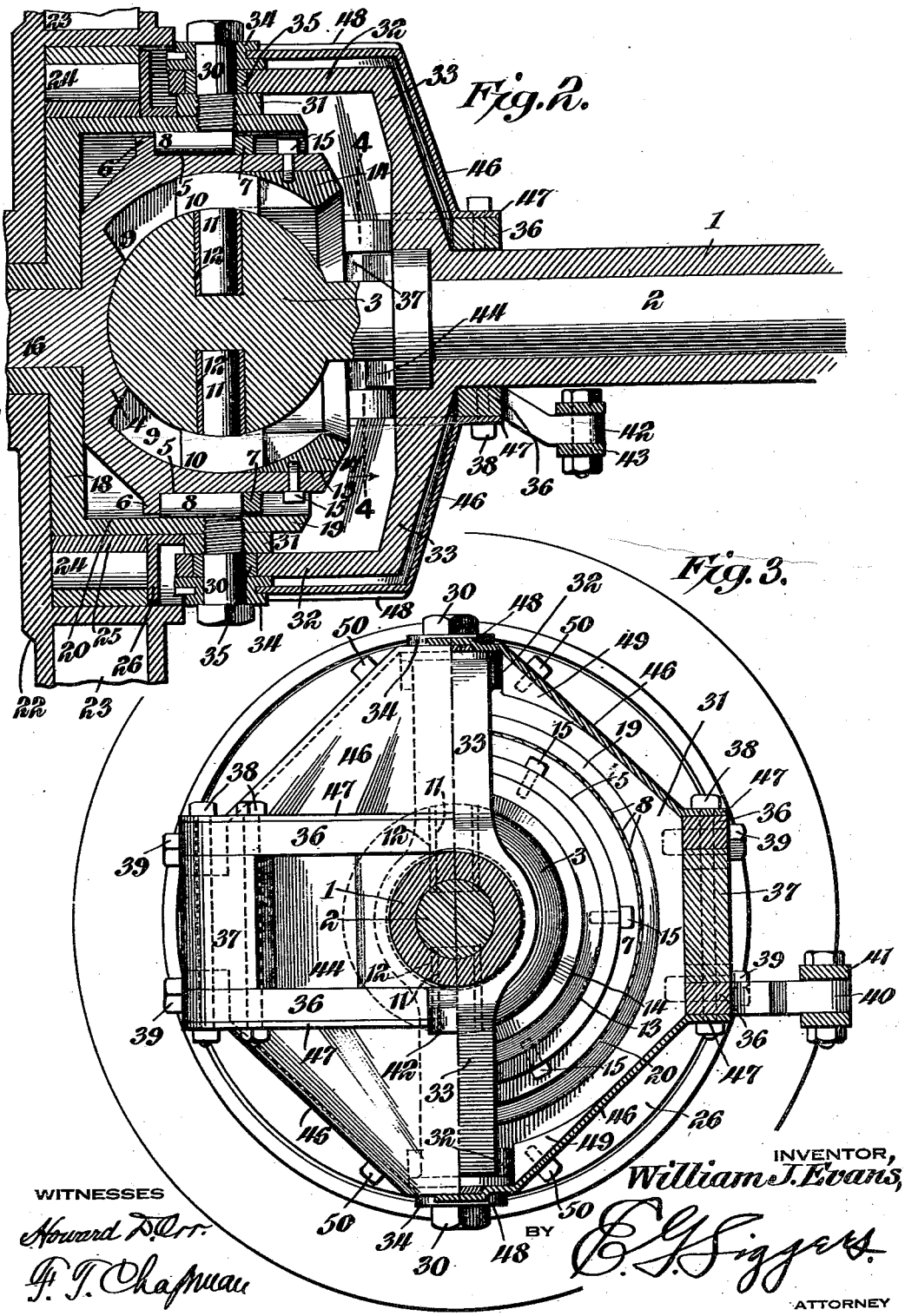

UNITED STATES PATENT OFFICE.

WILLIAM J. EVANS, OF DAYTON, IOWA.

COMBINED DRIVING AND STEERING WHEEL.

1,269,068.

Specification of Letters Patent.    Patented June 11, 1918.

Application filed August 18, 1916.   Serial No. 115,709.

*To all whom it may concern:*

Be it known that I, WILLIAM J. EVANS, a citizen of the United States, residing at Dayton, in the county of Webster and State of Iowa, have invented a new and useful Combined Driving and Steering Wheel, of which the following is a specification.

This invention has reference to combined driving and steering wheels for automobiles, and is an improvement upon the wheel shown and described in Letters Patent No. 1,073,971, granted to me September 23, 1913.

The object of the invention is to provide such a wheel with means whereby the working parts are protected from the effects of dust and dirt liable to reach them, so that the life of the parts is correspondingly prolonged and the accumulation of deleterious matter in places difficult of access is avoided.

The combined driving and steering wheel is mounted upon an axle traversed by a driving shaft receiving power from the power unit of the automobile, while the wheel and shaft are connected by a ball and socket joint permitting the displacement of the axis of the wheel with relation to that of the shaft to extents required for steering. In order to provide for the exclusion of dust and dirt from the working parts, the structure is somewhat modified over the showing of the aforesaid patent and certain of the parts are covered by a casing so constructed as to avoid interference with the steering movements of the wheel.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Fig. 2 is a view similar to Fig. 1, but taken at right angles thereto and showing the drive shaft and wheel axis in alinement.

Fig. 3 is an elevation, partly in section, of the inner end of the wheel structure, that is, the end toward the vehicle, the shaft and axle being shown in cross-section.

Figure 1:
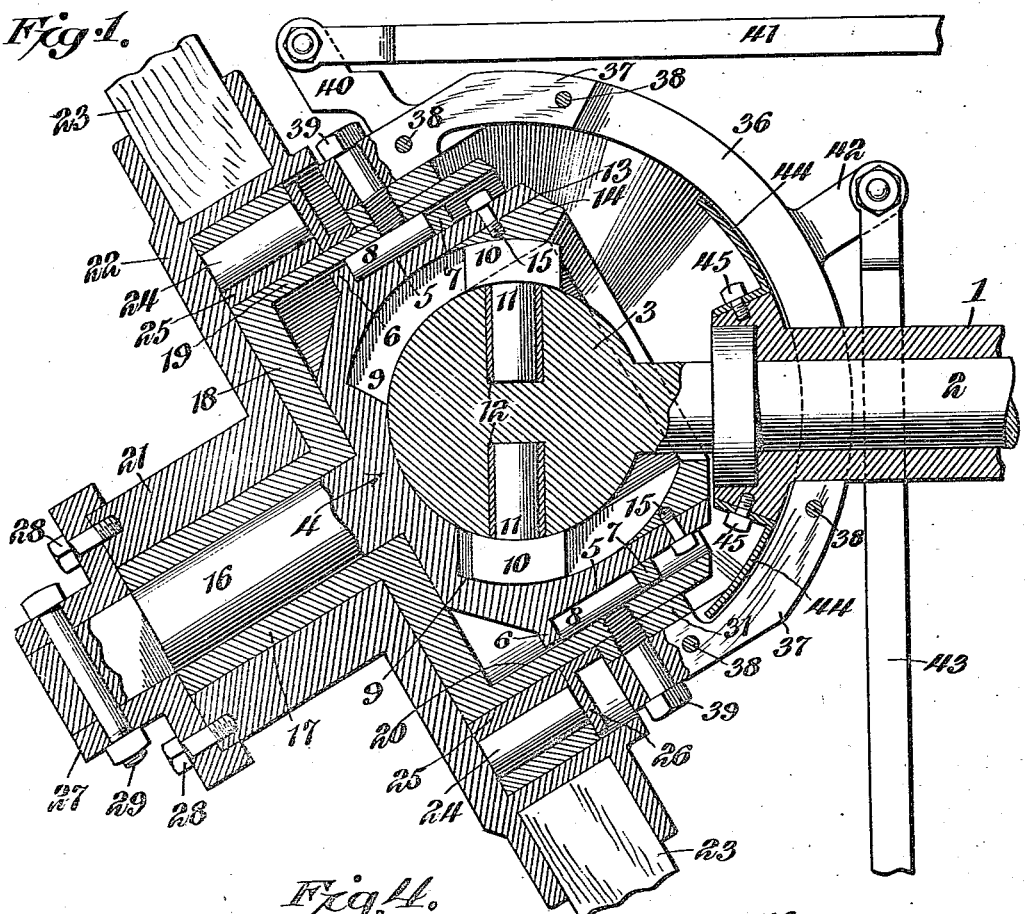
Figure 1 is a substantially horizontal section, with some parts in elevation, of a vehicle wheel constructed in accordance with the present invention and with the wheel axis at an angle to the axis of the drive shaft.
Figure 4:
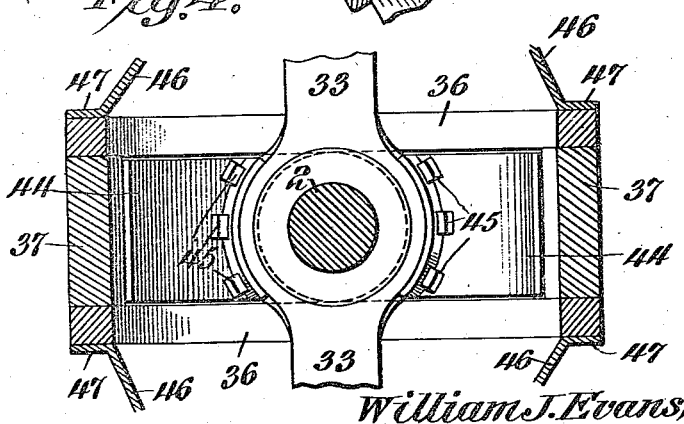
Fig. 4 is a detail section on the line 4—4 of Fig. 2.

Referring to the drawings there is shown an axle 1 longitudinally traversed by a shaft 2, which latter is assumed to be suitably connected to the power unit of the automobile to be driven thereby, and hence may be termed a power shaft. It will be understood that the invention is in practice applied to all four wheels of the vehicle, or, if desired, to two wheels only, and these two wheels may be either the front or the rear wheels. As the wheel structures are all alike, the description will be limited to one wheel only.

The shaft 2 projects beyond the outer end of the axle 1, it being understood that expressions of position both here and elsewhere in the description have reference to the installed positions of the parts. At the outer end the shaft 2 is formed into a ball 3 seated in a socket 4, which latter has a cylindrical outer face 5 provided in the particular showing of the drawings with a circumferential flange 6 and a retaining ring 7 spaced from the flange to provide a raceway for anti-friction rollers 8. It is to be understood that the invention is in no wise limited to any particular structure or type of anti-friction bearings, since any form of anti-friction bearings suited for the purpose may be used. The socket member 4 has matching grooves 9 on diametrically opposite sides receiving heads 10 formed on the ends of pins 11 seated in radial holes 12 in the ball 3, so that the socket 4 is constrained to rotate with the shaft 2 and its ball end 3 irrespective of the angular relation of the socket and ball. The grooves 9 have extensions 13 tangential to the curvature of the socket in the socket member 4, so that the ball 3 may be readily placed in a socket or removed therefrom, but in order to retain the parts together against accidental displacement, a suitably shaped block 14 is held in the mouth of each groove 9 by a screw 15 or otherwise.

The socket member 4 has a stem or spindle 16 in radial relation thereto, and on this spindle there is mounted a hub 17 having an expanded portion 18 terminating in a cup 19 housing the body of the socket 4 and in the particular showing of the drawings this cup has an inner wall 20 against which the rollers 8 bear. Of course, it will be understood that the cup portion of the hub, or any other portion thereof which it may be necessary to modify, will be suitably formed to accommodate any type of anti-friction bearings which may be adopted, such arrangements not forming any part of the present invention.

Mounted on the hub 17 is a sleeve 21 of a hub 22 constituting the hub of the supporting wheel of which spokes 23 are the only parts shown in the drawings, since the wheel may be of ordinary construction, and is, of course, assumed to be provided with a suitable tire. Anti-friction bearings represented by rollers 24 and cages 25 are interposed between the wheel hub and the cup 19, while a retaining ring 26 serves to hold the anti-friction bearings in place and may also serve in a measure as a dust ring protecting the anti-friction bearings from access of deleterious matter.

The wheel is retained on the hub structure 17 by a cap 27 made fast by screws 28 to the sleeve 21 of the hub 22, while a bolt 29 traversing the outer end of the spindle 16 serves to connect the spindle and wheel together when it is desired that the parts shall simultaneously rotate. If it be desired to have the steering wheel move free from connection with the drive shaft, the screws 28 may be removed, thus disconnecting the drive shaft from the wheel.

The parts so far described are in the main such as are shown and described in the aforesaid Letters Patent, and in themselves form no part of the present invention.

At diametrically opposite points the cup 19 carries pivot screws 30 threaded through a reinforcing ring 31 surrounding the cup or overhang 19, the ring 31 being shrunk upon or otherwise secured to the exterior of the cup for purposes of strength. Traversed by the screws 30 are eye ends 32 of a yoke 33 which may constitute part of the outer end of the axle 1, such yoke serving as the supporting means for the wheel, but permitting turning movements of the wheel about the axis of the screws 30, which screws are in alinement. Interposed between the head of each screw 30 and the corresponding portion of the yoke 33 is a grooved washer 34 and between this washer and the ring 31 is another washer 35 seated in the eye 32 and of sufficient thickness to prevent the grooved washer 34 from binding on the yoke 33, the parts being so proportioned that there is freedom of movement between the yoke 33, the ring 31 and the washers 34 without looseness of parts.

In order to rock the wheel about the axis of the bolts 30 for steering purposes, there is provided another yoke at right angles to the yoke 33. This last-named yoke, which may be termed the controlling yoke for the vehicle wheel, is composed of two curved bars 36 spaced apart sufficiently to straddle the axle. The ends of these bars engage the ring 31 and are spaced apart by blocks 37 to which the bars 36 are secured and by which they are suitably spaced by bolts 38. The bars 36 are made fast to the ring 31 by screws 39. Formed on or made fast to one of the bars 36 is a bracket 40 to which is connected one end of a bar 41 which latter, as is customary, is carried to the opposite wheel of the vehicle, so that the two wheels either at the front or the rear of the vehicle are connected together for simultaneous movement. One of the bars 36 is also formed with or has fast to it an ear 42 to which one end of a reach rod 43 is connected, this reach rod being connected to a suitable point for manipulation, so that when the rod 43 is moved the vehicle wheels participate in such movement.

Since the bars 36 are located on opposite sides of the axle and have a sufficient movement with relation to the axle to provide for the swing of the vehicle wheels in steering, the free space between the bars 36 is correspondingly prolonged and would give access of dust or dirt to the interior of the device through such space. To avoid this, guard plates 44 are made fast to opposite sides of the outer end of the axle 1 where joined by the legs of the yoke 33, screws 45 being employed for the purpose in the particular structure shown in the drawing. These guard plates are of such length that when the shaft 2 and spindle 16 are in alinement, they cover the opening between the bars 36, which opening extends from one block 37 to the other, these blocks also serving as stops for the wheel in its steering movements. It is only when the wheel is turned for steering that one or the other of the guard plates 44 in any manner uncovers the space between the bars 36, so that the liability of access of dust or dirt to the working parts of the steering wheel is reduced to a minimum.

To further protect the working parts of the wheel which would otherwise be largely exposed through the spaces between the legs of the yoke 33 and the yoke structure formed by the bars 36, shield members 46 are provided, these members being conveniently made of sheet metal stamped into appropriate shape. The shield 46 is made of two or more parts each provided with a flange 47 connected to a respective one of the bars 36 and suitably shaped to close in the space included by a bar 36 and the corresponding leg of the yoke 33. Each shield member 46 is appropriately sloped from the flange 47 toward the corresponding leg of the yoke 33 and where extending over such leg 33 is flattened, as indicated at 48, and is suitably notched to enter the groove in the washer 34, whereby the parts are rendered practically dust-tight and yet by the removal of screws 38 holding the guard 46 to the bars 36 the respective guards may be lifted away from the wheel to expose the interior parts thereof for cleansing or oiling or repairs.

Wherever the guards are so spaced from the parts covered as to be liable to cause looseness, filler blocks 49 are introduced and are held in place by screws 50 or in any other suitable manner.

It will be understood that the casing 46 may be made of as many sections as is found desirable to permit ready access to the parts ordinarily covered by the casing.

What is claimed is:—

1. The combination with a steering wheel having interior driving connections and a spindle upon which the wheel is mounted, of an axle terminating in a yoke having its ends connected to the wheel spindle on opposite sides of the axis of the wheel, a steering yoke straddling and closely embracing the axle exterior to the axle yoke and arranged at right angles to the latter, and a casing structure secured to the yoke and to the wheel spindle and wholly inclosing the axle yoke.

2. The combination with a steering wheel having interior driving connections and a spindle upon which the wheel is mounted, of an axle terminating in a yoke having its ends connected to the wheel spindle on opposite sides of the axis of the wheel, a steering yoke straddling and closely embracing the axle exterior to the axle yoke and arranged at right angles to the latter, and a casing structure secured to the yoke and to the wheel spindle and wholly inclosing the axle yoke, said casing structure comprising a series of separate shield members in overlapping relation at the axle yoke and secured to the top and bottom portions of the steering yoke.

3. The combination with a steering wheel having interior driving connections and a spindle upon which the wheel is mounted, of an axle terminating in a yoke connected to the wheel spindle on opposite sides of the axis of the wheel, a steering yoke straddling the axle exterior to the axle yoke in close embracing relation to the axle and arranged at right angles to said axle yoke, a casing structure secured to the steering yoke and to the wheel spindle and wholly inclosing the axle yoke, and guard means fast to the axle interior to the steering yoke.

4. The combination with a steering wheel having interior driving connections and exterior driving connections leading thereto, of a spindle on which the wheel is mounted, an axle through which the interior driving mechanism extends and terminating in a yoke connected at the ends to the wheel spindle in the steering axis thereof, a steering yoke connected to the wheel spindle concentric with the steering axis and straddling the axle in closely embracing relation to the top and bottom thereof exterior to the yoke on the axle, shield members fast to the top and bottom portions of the steering yoke exterior to the axle yoke and wholly inclosing the latter, and also extending to and movable about the steering axis of the wheel, and guard members carried by the axle within the steering yoke.

5. The combination of a steering wheel, a spindle therefor, wheel driving mechanism interior to the spindle, an axle terminating in a yoke connected to and carrying the wheel spindle at the steering axis of the wheel, a drive shaft extending through the axle, a steering yoke connected at the ends to the wheel spindle and comprising bars spaced apart to lie on opposite sides of the axle exterior to the axle yoke, shield members fast to the bars of the steering yoke and inclosing the axle yoke and extending to and connected to the wheel spindle at the steering axis thereof, and guard members carried by the axle within the steering yoke in closing relation to the space between the bars constituting the steering yoke.

In testimony that I claim the foregoing as my own, I have hereto affixed my signature in the presence of two witnesses.

WILLIAM J. EVANS.

Witnesses:
 HANNAH NELSON,
 EDWARD PETERSON.